May 20, 1947.                W. H. GILLE                2,420,946
FLYING HOOD RELEASE SYSTEM
Filed Oct. 2, 1942
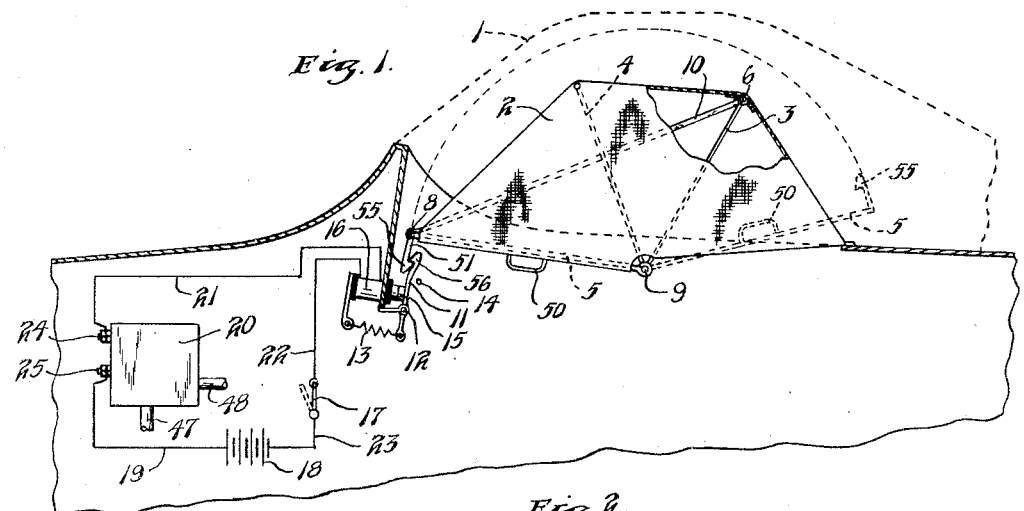
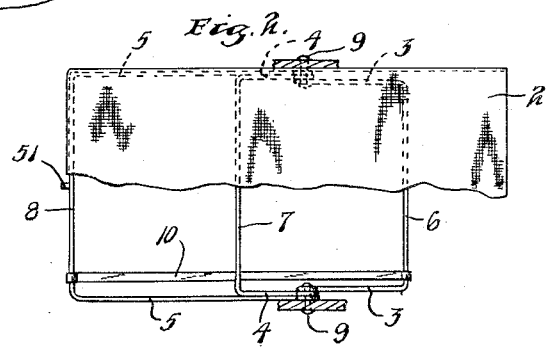
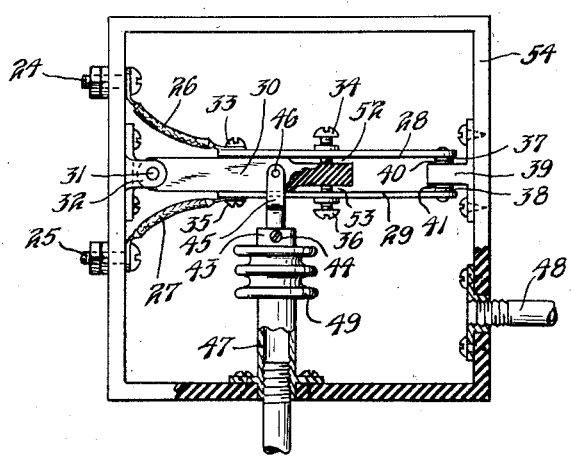
INVENTOR.
WILLIS H. GILLE
BY
George H. Fisher
ATTORNEY Patented May 20, 1947

2,420,946

UNITED STATES PATENT OFFICE 2,420,946

FLYING HOOD RELEASE SYSTEM

Willis H. Gille, St. Paul, Minn., assignor to Minneapolis-Honeywell Regulator Company, Minneapolis, Minn., a corporation of Delaware Application October 2, 1942, Serial No. 460,522

19 Claims. (Cl. 244—121)

My invention relates to a flying hood control system and particularly to an electromagnetic safety system for controlling the operation of such hood.

In the training of aircraft pilots in the art of blind flying it is customary to provide within the cabin of the plane a hood which comes down over the cockpit of the plane so as to close off the vision of the pilot simulating thereby actual conditions existing in blind flying and requiring the pilot to maneuver the plane entirely by the indicating instruments of the plane during such practice flights.

However, in the case of an inexperienced pilot the airplane may, during such maneuvering of the plane, go into a dive or stall without the detection of such conditions by the pilot from the indicating instruments until too late to prevent the destruction of the plane and occupants.

It is an object of my invention therefore to provide a system for controlling this hood during such flight whereby should the speed of the plane exceed a predetermined maximum indicating a dive or upon the speed of the plane decreasing below a predetermined minimum indicating the approach of a stalling condition the hood will be automatically raised and the pilot thereby informed of the danger existing. Upon the raising of the hood the pilot will then be in a position to resume normal operation of the plane so as to prevent otherwise disastrous results from the approaching stall or dive.

Another object of my invention is to provide a system of the character described whereby upon power failure due to accidents, saboteurs or other cause the hood will automatically be raised from closed position to open position so that the pilot will be properly notified of such power failure. There is thus provided a safety feature assuring the novice or inexperienced training pilot of power failure protection or protection against a broken hood control circuit. My invention thereby increases the confidence of the inexperienced pilot in the plane and in himself besides arresting the danger of his possible destruction from accident due to stall or dive during the practice maneuvers of a pilot with his vision impaired by the hood.

A further object of my invention is to provide a novel air speed switch.

It is thus an object of my invention to provide means for increasing the safe operation of a plane during practice flights and prevent insofar as possible the unnecessary loss of life and limb during the necessary practice of blind flying as previously described.

Other objects and advantages of this invention are set forth in the following description, taken with the accompanying drawings, and the novel features thereof are pointed out in the appended claims. The disclosure, however, is illustrative only and I may make changes in details, especially in matters of shape, size and arrangement of parts within the principal of the invention, to the full extent indicated by the broad and general meanings of the terms in which the appended claims are expressed.

In the accompanying drawings wherein like reference characters indicate corresponding parts in the various figures, Figure 1 is a diagrammatic view partly in detail of my flying hood control system showing a flying hood in lowered position and indicating in dotted lines the hood in adjusted raised position, Figure 2 is a top view of the hood shown in Figure 1, and Figure 3 is an enlarged view of the air speed control switch shown in Figure 1 with the side removed and certain parts broken away to better illustrate the device.

Referring to Figure 1, numeral 1 represents a cabin fuselage within which is positioned a hood 2 having supports 3, 4 and 5 positioned respectively at opposite sides of the hood 2. The correspondingly mounted supports 3, 4 and 5 are connected respectively by the upper bars 6, 7 and 8. A pivot 9 connects the support 3, 4 and 5 so that the same may be pivotally moved in raising and lowering the hood 2. The hood 2 is suitably fastened to the bars 6, 7 and 8.

An operating handle 50 is mounted on the support 5 so that the hood may be manually closed. An elastic spring member 10 formed of any suitable tension material such as rubber is fastened at one end to the rod 6 and at the opposite end to the rod 8 as shown in Figures 1 and 2. Thus, upon release of the hood the same will be raised under spring tension to an open position. A latch pin 51 is affixed at the free end of the supporting bar 5 at the cross rod 8. The latch pin 51 has provided a hook-like end 55 adapted to cooperatively engage with a similar hook-like end 56 formed on a latch member 11 as shown in Figure 1.

The latch member 11 is pivoted at 12 and is normally held under the tension of a spring 13 out of engagement with the latch pin 51. A pin 14 limits the pivotal movement of the latch member 11 under tension of the spring 13. An armature 15 is mounted on the latch member 11 so as to cooperate with a solenoid 16 upon energization thereof.

Upon energization of the solenoid 16, the armature 15 will move in such a manner as to cause a pivotal movement of the latch member 11 in a counter-clockwise direction as shown in Figure 1 causing the engagement of the latch pin 51 upon the said latch pin 51 being in lower position as upon the downward manual movement of the hood 2 to a closed position. At normal operating speed the energization of the solenoid 16 is controlled by the switch member 17. The circuit of the solenoid 16 is energized through a suitable source of power indicated generally by the numeral 18. Upon deenergization of the solenoid 16 the hook-like end portions 55 and 56 of the latch pin 51 and the latch member 11, respectively, are so arranged as to readily disengage upon pivotal movement of the latch member 11 under tension of spring 13.

The current from the source of power 18 passes through a conductor 19 to a terminal 25 of an airspeed switch indicated generally by the numeral 20 and which in normal operation is closed. The current in such case passes through the airspeed switch 20, to a terminal 24, to a conductor 21, through solenoid 16, to a return conductor 22, through the control switch 17 and back to the source of power 18 by a conductor 23.

It will thus be seen that in normal operation of the plane upon moving the hood to a closed position through the manual operation of the handle 50 and then energizing the electromagnet 16 by closing the switch 17 the hood 2 will be locked in such lowered position through the coaction of the latch pin 51 and latch member 11, the said latch pin 51 and latch member 11 locking as shown in Figure 1 at the engaging ends 55 and 56.

As shown in Figure 3 the airspeed switch mechanism is housed in a casing 54 formed of suitable insulating material. The terminals 24 and 25 mounted in the casing 54 are connected respectively to opposite resilient switch blades 28 and 29 through the conductors 26 and 27. The switch blades 28 and 29 are mounted in spaced relation at opposite sides of an insulation member 30 by the respective attachment screws 33 and 35. One end of the insulation member 30 is pivotally connected at 31 to a projecting arm 32 fastened at the inner wall of the casing 54, as shown in Figure 3. The opposite end of the insulation member 30 has provided therein recesses 52 and 53. Adjustment screws 34 and 36 are screw threadedly engaged in the respective switch blades 28 and 29, and contact the insulation member 30 in the respective recesses 52 and 53. The tension and relative position of the switch blades 28 and 29 may be readily adjusted for calibration purposes by the adjustment of the screws 34 and 36.

At the free end of the switch blade 28 is a contact member 37 while at the corresponding free end of the switch blade 29 is a contact member 38. The said contact members 37 and 38 are positioned in opposite relation on the inner side of the said switch blades 28 and 29 respectively. Interposed intermediate the two switch blades 28 and 29 is a projecting arm 39 mounted on the inner wall of the casing 54. Positioned on the projecting arm 39 are the contact members 40 and 41 adapted to engage respectively the contacts 37 and 38. In normal engaging relation the current will flow from terminal 25 through switch blade 29, contact 38, contact 41, projecting member 39, contact 40, contact 37, switch blade 28 and in turn to terminal 24. It will thus be seen that in normal engaging relationship with the switch 17 in closed position, a current will normally flow through the airspeed switch to the solenoid 16.

A pressure responsive device 49 is mounted in the casing 54 and furnished with a connection 47 through which the dynamic pressure line of a standard Pitot tube is connected to the interior of the pressure device 49. The static pressure line from the Pitot tube is connected with the interior of the casing 54 by means of a connection 48.

A nipple 43 is mounted on the pressure responsive member 49 and has pivotally connected thereto at 44 an actuating rod 45 having an opposite bifurcated end which is in turn pivotally connected at 46 to the insulation member 30.

It will be readily seen that upon the speed of the airplane being sufficiently slow as to cause a decrease in the differential pressure between the dynamic and static pressures below a predetermined minimum, the pressure responsive member 49 will contract causing pivotal movement of the insulation member 30. This pivotal movement of the member 30 will be in a direction towards the pressure connection member 47 and will cause the contact 38 to break from the contact 41 and thereby open the circuit of the solenoid 16. Similarly, upon the speed of the plane increasing above a predetermined maximum, the increase in the differential pressure between the pressures of the dynamic and static pressures will cause the pressure responsive member 49 to expand causing thereby pivotal movement of the member 30 in a direction opposite to that previously described. The latter pivotal movement of the member 30 will be in a direction away from the pressure connection member 47 and will cause the contact 37 to break from the contact 40 and thereby opening the circuit of the solenoid 16.

Upon the latch member 11 locking the latch pin 51 in downward position so as to hold the hood 2 in a closed position on energization of the solenoid 16 by closing switch 17, the solenoid 16 will hold the latch member 11 in such position until the circuit of the solenoid is broken. Correspondingly, upon deenergization of the solenoid 16 the spring member 13 will cause the actuation of the latch member 11 in a clockwise direction causing a release thereby of the latch pin 51. The latch pin 51 and the hood 2 under tension of the spring 10 will then move upward to an open position. It will thus be seen that upon the speed of the plane increasing above a predetermined maximum and also upon the speed of the plane decreasing below a safe predetermined minimum the hood 2 will be released and returned by action of the spring 10 to an open position and thereby serving as a warning to the pilot of the impending danger. Similarly, should the circuit of the solenoid 16 be broken through any cause it will be impossible to latch the hood 2 in a closed position since the spring 13 will hold the latch member 11 out of engaging relationship with the latch pin 51.

From the foregoing, it will be readily seen that I have provided a safe system for controlling the conduction of the training of blind flying so that the danger of such flight may be reduced to the minimum and assure the carrying on of such practice flights under only the safest conditions.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim as my invention:

1. In an automatic hood control system for airplanes, comprising, in combination, a hood movable from an open to a closed position, biasing means normally urging said hood toward an open position, latch means movable between two extreme positions and operable in one of said positions to maintain said hood in closed position, electromagnetic means for moving said latch means from one extreme position to the other, said electromagnetic means and said latch being disposed so that upon energization of said electromagnetic means said latch is caused to move promptly from one extreme position to its other extreme position, biasing means operable upon deenergization of said electromagnetic means to promptly return said latch to its original position, an electric circuit for energizing said electromagnetic means, and airspeed responsive means for breaking the circuit to deenergize the electromagnetic means at a predetermined minimum and maximum airspeed.

2. An automatic hood control system for airplanes, comprising, in combination, a hood movable from an open to a closed position, biasing means for moving the hood to an open position, latch means movable between two extreme positions, electromagnetic means for moving said latch means from one extreme position and holding it in its other extreme position, an electric circuit for energizing the electromagnetic means, switch means for breaking the said circuit, said switch means including a stationary member, a pair of movable contact members biased to normally engage said stationary member, said stationary member and said contact being so disposed that departure of one movable contact from engagement with the stationary member stores up energy in said other movable contact urging the return of said departed contact, airspeed responsive means for actuating the said switch means in such a manner as to break the circuit at a predetermined minimum and maximum airspeed whereby the said electromagnet is deenergized and the hood under the said biasing means is returned to an open position, and means operable to promptly move said latch means to the other extreme position when said electromagnetic means is deenergized.

3. An automatic hood control system for airplanes, comprising, in combination, a hood movable from an open to a closed position, first biasing means for actuating the hood to an open position, latch means for locking the hood in a closed position, second biasing means for actuating the latch means in such a manner as to release the hood for return to the open position in response to the first biasing means, electromagnetic means acting in opposition to the second biasing means for moving and holding the latch means to a locking position, a circuit for energizing the electromagnetic means, switch means for making and breaking the circuit, said switch means including a bifurcated flexure portion and a fixed member positioned between and engaging both tines of said bifurcated portions, the arrangement being such that operable movement of said switch increasingly stores returning energy in one of the tines of said bifurcated portions, and air speed responsive means for actuating the switch means in such a manner as to break the circuit at a predetermined maximum and minimum air speed, whereby the latch means in response to the second biasing means is moved to and maintained in a non-locking position thereby releasing said hood.

4. An automatic hood control system for airplanes, comprising, in combination, a hood movable from an open to a closed position, biasing means for moving the hood to an open position, means for holding the hood in a closed position, electromagnetic means for moving said holding means into hood holding position, an electric circuit for energizing the electromagnetic means, a pivotally mounted member, a first resilient switch arm and a second resilient switch arm electrically connected in the said circuit, the switch arms positioned in spaced relation and oppositely mounted on said pivotal member, a switch contact positioned intermediate the first and second switch arms for engagement with the said switch arms so as to make the said circuit through the switch arms, an air speed responsive member, an arm operatively connecting the air speed responsive member and the pivotal member for pivoting said member in response to air speed condition so as to break the circuit at the switch contact and the first switch arm upon a predetermined maximum air speed condition and so as to break the circuit at the switch contact and the second switch arm upon a predetermined minimum air speed condition, and means for moving said hood holding means from holding position when said circuit is broken.

5. An automatic hood control system for airplanes, comprising, in combination, a hood movable from an open to a closed position, first biasing means for actuating the hood to an open position, latch means for locking the hood in a closed position, second biasing means for actuating the latch means in such a manner as to prevent locking the hood in closed position, electromagnetic means operable upon energization to move and hold said latch means to a locking position, a circuit for energizing the electromagnetic means, a pivotally mounted member, a first resilient switch arm and a second resilient switch arm electrically connected in the said circuit, the switch arms positioned in spaced relation and oppositely mounted on said pivotal member, a switch contact positioned intermediate the first and second switch arms for engagement with the said switch arms so as to make the said circuit through the switch arms, an air speed responsive member, an arm operatively connecting the air speed responsive member and the pivotal member for pivoting said member in response to air speed conditions so as to break the circuit at the switch contact and the first switch arm upon a predetermined maximum air speed condition and so as to break the circuit at the switch contact, and the second switch arm upon a predetermined minimum air speed condition, whereby upon a break in the said circuit the latch means is released in response to the second biasing means and the hood is biased to open position in response to the first biasing means.

6. The combination comprising, a control for an electric circuit, a stationary member, first and second means disposed in spaced parallel relation and operable in conjunction with said stationary member for closing the circuit, air speed responsive means connected to and operating the first and second means, the first means arranged to be moved from said stationary member and said second means by the air speed responsive means so as to open the circuit at a predetermined maximum air speed and the second means arranged to be moved from said stationary member and said first means by the air speed responsive means so as to break the circuit at a predetermined minimum air speed.

7. The combination comprising, a control for an electric circuit, a pivotal member, first and second switch arms mounted on said member in spaced parallel relation, a contact positioned intermediate the first and second switch arms for making said circuit between the first and second switch arms, and an air speed responsive means for pivoting said member for causing the first switch arm to move from said second switch arm and said contact to break the circuit at said contact upon a predetermined maximum air speed condition and for causing the second switch arm to move from said first switch arm and said contact to break the circuit at said contact upon a predetermined minimum air speed condition.

8. An aircraft instrument comprising, in combination, a casing, a pressure responsive device mounted within the casing, a static air pressure connection leading into the casing and a dynamic air pressure connection leading into the said pressure responsive device, a member pivotally mounted within the said casing, a rod mechanically connecting the member to the pressure responsive device for pivotally actuating said member responsive to the differential pressure between the dynamic and static air pressures, a pair of spring blades mounted on said member in spaced parallel relation, and a projecting contact member positioned intermediate the spring blades in such a manner that upon a predetermined maximum differential pressure the spacing of the free end of said blades will be increased thereby causing one of said blades to disengage said contact and upon a predetermined minimum differential pressure the spacing of the free ends of said blades will be increased thereby causing the other of said blades to disengage said contact.

9. An aircraft control means, comprising, in combination, a casing, a pressure responsive device mounted within the casing, static and dynamic air pressure connections leading into the said casing in such a manner as to differentially actuate the pressure responsive device, a control for an electric circuit, said electric circuit including a pair of resilient switch blades, and means for operating said resilient switch blades by the pressure responsive device in such a manner as to break the circuit at a predetermined maximum pressure and at a predetermined minimum pressure, said switch blades being disposed to urge the reestablishment of said broken circuit.

10. An aircraft control means, comprising in combination, a casing, a pressure responsive device mounted within the casing, first means for conducting air pressure to the casing for actuating said device, second means for making an electric circuit, said second means mechanically connected to said device and operable thereby responsive to pressure fluctuation to break said circuit when said pressure responsive device is subjected to pressures above a predetermined maximum pressure and below a predetermined minimum pressure, and means yieldably resisting the breaking of said circuit at maximum and minimum pressures.

11. The combination, comprising a control for an electric circuit, air speed responsive means, and means for making said circuit during predetermined safe air speed conditions, said last named means including pivotally mounted switch means biased to a central closed circuit position and yieldably resisting movement therefrom, means actuated by said air speed responsive means for breaking said circuit upon air speed conditions in excess of the predetermined safe air speed conditions and means for selectively adjusting the yieldable resistance of said switch means from said central closed circuit position.

12. A system of the character described, comprising, in combination, a hood movable from an open to a closed position, first tension means for actuating the hood to an open position, a latch pin fixedly mounted on said hood, the said latch pin having a hook-like member formed at an end thereof, a pivotally mounted latch bar having a hook-like member formed at one end thereof for engagement with the hook-like member formed at the end of the latch pin for locking the hood in a closed position, second tension means for pivoting the latch bar to a first position so as to disengage the latch pin for releasing said hood for return to the open position in response to the first tension means, an armature mounted on the latch bar, an electromagnet for actuating the armature to move the latch bar to a second position in opposition to the second tension means promptly upon energization of said electromagnet, a circuit for energizing the electromagnet, a pivoted arm, an air speed responsive device, an actuating rod connecting the pivoted arm and said device, a pair of spring blades connected in said circuit and mounted on said arm in spaced relation, and a projecting contact positioned intermediate the spring blades in such a manner as to contact said spring blades for closing the circuit at predetermined safe air speed conditions and for opening said circuit upon actuation of said pivoted arm by said air speed responsive device under other than the predetermined safe air speed conditions whereupon the electromagnet is deenergized causing said latch bar to be promptly moved to said first position under the second tension means and return of the hood to open position under the first tension means.

13. An aircraft instrument, comprising, in combination, a pair of actuating arms, control means, air speed responsive means for causing one of said arms to move so as to actuate said control means upon a predetermined maximum air speed and for causing the other of said arms to move so as to actuate said control means upon a predetermined minimum air speed and said control means including a single member for maintaining one of said actuating arms substantially stationary during the operative movement of the other actuating arm.

14. An aircraft instrument, comprising, in combination, a pair of separately movable control means, air speed responsive means for moving one of said control means for actuation of said one control means upon a predetermined maximum air speed and for moving the other of said control means for actuation of said other control means upon a predetermined minimum air speed, and a member interposed between and engaging said pair of movable control means, said member functioning to maintain one of said control means stationary during the operative movement of the other.

15. An aircraft instrument comprising in combination, an actuating member, a pair of circuit controlling means actuated selectively by said member, an abutment member interposed between and engaging said pair of circuit controlling means, the pair of circuit controlling means and said abutment member forming a part of said circuit, and air speed responsive means operatively engaging said actuating member for actuating one of said circuit controlling means so as to open said circuit at a high air speed limit and for actuating the other of said circuit controlling means so as to open said circuit at a low air speed limit.

16. An aircraft instrument, comprising, in combination, a first control means for an electric circuit, a second control means for said electric circuit, an abutment member, the first and second control means in conjunction with said abutment member being operative to close said circuit, and air speed responsive means operatively engaging said first control means in such a manner as to move said control means from said abutment member to open said circuit upon an increase in air speed and operatively engaging said second control means in such a manner as to disengage said control means from said abutment member to open said circuit upon a decrease in air speed.

17. An aircraft control system, comprising, in combination, air speed responsive means, switch means, said switch means including a pair of flexible conductor blades positioned in spaced parallel relation, a pair of contacts engageable by said switch means, said switch means actuated by said air speed responsive means in such a manner as to disengage one of said contacts upon a predetermined low air speed condition, and to disengage the other of said contacts upon a predetermined high air speed condition, the arrangement of said flexible blades and said contacts being such that when one blade is disengaged from its associated contacts the other functions to urge its return to contact engaging position, and a hood control means, said hood control means being movable to an inactive position upon disengagement of either of said contacts by said switch means, and movable to active position upon the reengagement of said contacts by said switch means.

18. An aircraft instrument comprising in combination, a circuit controlling means including a pair of resilient members cooperating with a pair of stationary members for together closing a circuit, and air speed responsive means operatively engaging said pair of circuit controlling means for actuating one of said pair of circuit controlling means in such a manner as to open said circuit at a high air speed limit and for actuating the other of said pair of circuit controlling means in such a manner as to open said circuit at a low air speed limit, each of said pair of resilient members being disposed to urge the return of the other of said pair to circuit closing position.

19. An aircraft control means, comprising, in combination, airspeed responsive means, switch means, a pair of stationary contacts, said switch means including a pair of flexure members each biased to normally engage one of said pair of contacts, said switch means being actuated by said airspeed responsive means in such a manner as to disengage one of said contacts upon a predetermined low air speed condition and to disengage the other of said contacts upon a predetermined high airspeed conditon, an electromagnetic latch means movable between active and inactive positions and controlled by said switch means, said electromagnetic latch means being deenergized upon disengagement of either of said contacts by said switch means, and means for promptly moving said latch means into an inactive position when deenergized.

WILLIS H. GILLE.

REFERENCES CITED

The following references are of record in the file of this patent:

UNITED STATES PATENTS

| Number | Name | Date |
| --- | --- | --- |
| 1,102,566 | Besley | July 7, 1914 |
| 1,232,456 | Bliss | July 3, 1917 |
| 1,414,912 | Wittingham | May 2, 1922 |
| 1,780,179 | Elliott | Nov. 4, 1930 |
| 2,137,221 | Aikman | Nov. 22, 1938 |
| 2,225,236 | Shaw | Dec. 17, 1940 |
| 2,288,436 | Cahan | June 30, 1942 |
| 2,202,449 | Fleet | May 28, 1940 |
| 1,445,953 | Illgen | Feb. 20, 1923 |
| 1,937,520 | Lightner | Dec. 5, 1933 |
| 1,938,853 | Miller | Dec. 12, 1933 |
| 1,970,812 | Myers | Aug. 21, 1934 |
| 2,112,253 | Smith | Mar. 29, 1938 |
| 2,349,982 | Murray-Waller | May 30, 1944 |

FOREIGN PATENTS

| Number | Country | Date |
| --- | --- | --- |
| 811,712 | France | Jan. 23, 1937 |